Oct. 23, 1956 H. H. ENGEMANN 2,767,696
VALVE ROTATING DEVICE
Filed June 4, 1953
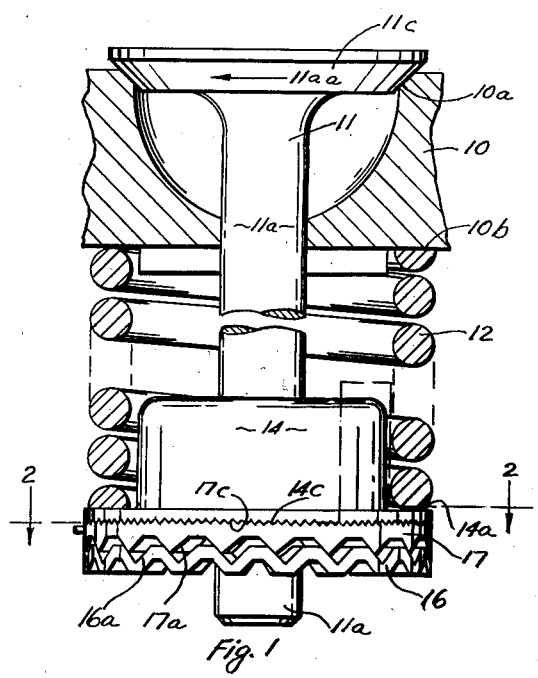
Fig. 1
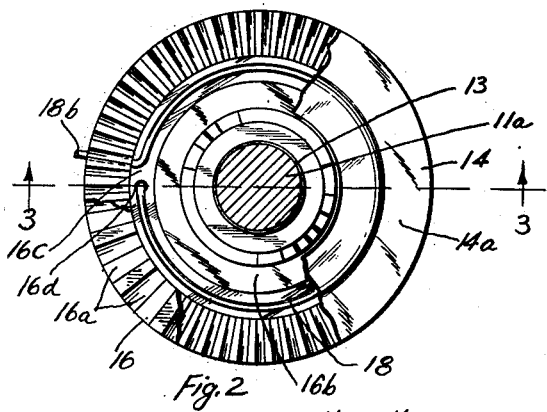
Fig. 2
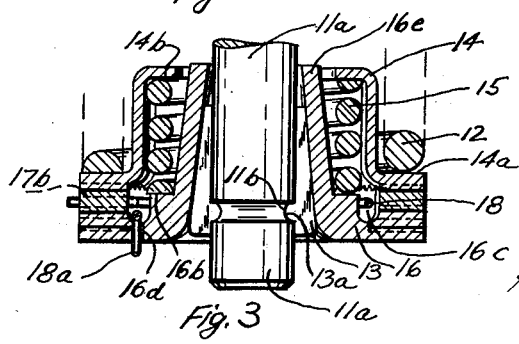
Fig. 3
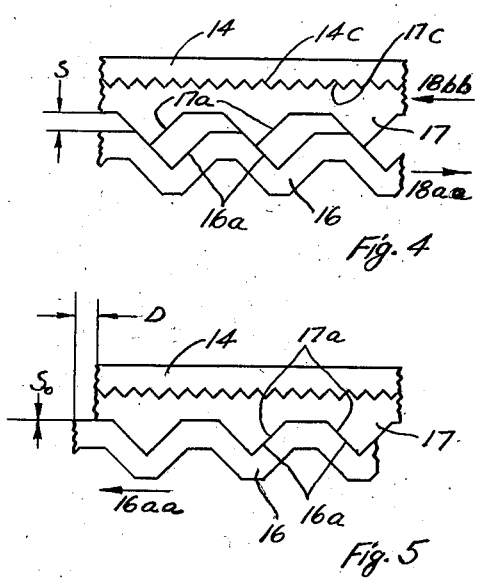
Fig. 4
Fig. 5
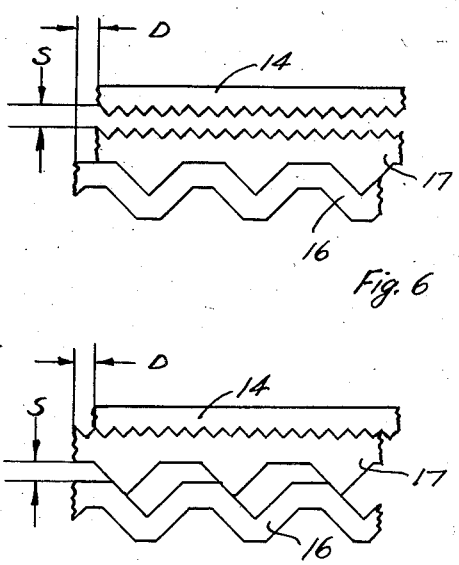
Fig. 6
Fig. 7
INVENTOR.
Herbert H. Engemann
BY
Hyde, Meyer, Baldwin & Doran
ATTORNEYS

United States Patent Office 2,767,696
Patented Oct. 23, 1956

2,767,696

VALVE ROTATING DEVICE

Herbert H. Engemann, Cleveland Heights, Ohio

Application June 4, 1953, Serial No. 359,569

13 Claims. (Cl. 123—90)

This invention relates to improvements in a device for effecting relative rotation between two parts and more particularly to a valve rotating device.

One of the objects of the present invention is to provide a device for effecting relative rotation between two parts upon relative movement between them and more specifically wherein said relative movement is along the axis of rotation of one of the parts or the common axis of rotation of both parts.

Another object of the present invention is to provide a device for effecting relative rotation between two parts when subjected to change in longitudinal load applied generally in the same direction as the axis of rotation.

Another object of the present invention is to provide a device for positively rotating a valve or other similar spring biased members by intermittent movement.

Another object of the present invention is to provide a valve rotating device not requiring pre-assembly before installing in the valve operating linkage so as to avoid pre-assembly cost and to provide easy servicing, inspection and replacement of parts when desired.

Another object of the present invention is to provide a compact, self-contained device for positively rotating a poppet valve each time the valve head is off its seat.

Another object of the present invention is to provide a self-contained rotating device made up of only a small number of parts.

Another object of the present invention is to provide a valve rotation device producing valve rotation only when the valve is out of contact with its seat so as to prevent wear on the contacting surfaces due to scrubbing.

Another object of the present invention is to provide a valve rotating device in which a shiftable means providing rotation is not subjected to the total valve spring load.

Another object of the present invention is to provide a valve rotating device adapted for installation on a valve assembly of an internal combustion engine without changing the design or operation of this assembly and without adding additional parts to the internal combustion engine.

Another object of the present invention is to provide a valve rotating device which is positive in operation and is not dependent upon engine speed or vibrations to produce a rotational effect.

Another object of the present invention is to provide a self-contained valve rotating device which becomes part of the valve operating linkage and derives its action from the intermittent motion applied to the valve.

Another object of the present invention is to provide a valve rotating device characterized by its structural simplicity, economy of manufacture, ease of assembly and servicing of its parts, and operating efficiency under all conditions.

Other features of this invention reside in the arrangement and design of the parts for carrying out their appropriate functions.

Other objects and advantages of this invention will be apparent from the accompanying drawings and description and the essential features will be set forth in the appended claims.

In the drawings:

Fig. 1 is a side elevational view of the valve rotating device of the present invention in a poppet valve assembly with this device located between a valve spring and a longitudinally reciprocable valve stem with this view showing the valve spring and the internal combustion engine head in cross section with the valve in its closed position;

Fig. 2 is a horizontal, transverse sectional view through the valve rotating device and valve stem along the line 2—2 of Fig. 1 with portions thereof broken away for clarity;

Fig. 3 is a longitudinal sectional view taken along the line 3—3 of Fig. 2; while Figs. 4, 5, 6 and 7 are enlarged, circumferential views in elevation of the three adjacent relatively rotatable members, shown on the valve rotating device in Fig. 1, with these different figures showing in operational sequence these members in different positions during one cycle of valve rotation action during which the valve starts and finishes in the closed position.

Before the device for effecting rotation here illustrated is specifically described, it is to be understood that the invention here involved is not limited to the structural details or arrangement of parts here shown since devices embodying the present invention may take various forms. It also is to be understood that the phraseology or terminology herein employed is for purposes of description and not of limitation since the scope of the present invention is denoted by the appended claims.

Those familiar with this art will recognize that this device for effecting or causing relative rotation between two parts may be applied in many ways, but I have chosen to illustrate the same as a valve rotating device in connection with an internal combustion engine poppet valve assembly of conventional type. However, this device may be useful in providing relative rotation to members in any intermittently operative linkage.

Rotation of poppet valves in internal combustion engines has become a well recognized and beneficial principle maintaining long life and efficiency in valve operation. The main benefit of valve rotation is that the valve seating surfaces are maintained free from deleterious deposits. Furthermore, circularity of valve seating surfaces is maintained through even seat wear to maintain thereby leak-proof valve closing.

Fig. 1 discloses a poppet valve assembly in combination with a valve rotating device. The reference numeral 10 designates an engine part such as, for example, a portion of a cylinder head of an internal combustion engine. The operating parts of such an internal combustion engine are not shown but will be referred to by their conventional names. Engine part 10 more specifically represents a cross sectional view through one of the valve ports. A poppet valve 11 has a valve stem 11a slidable longitudinally in its bore in the engine part 10. Valve 11 has a valve head 11c normally held closed, firmly seated against and in coaction with a valve seat 10a on the engine part by the bias of a valve spring 12. This valve spring 12 of the compression type abuts against the engine part 10 at its upper end and against the valve rotating device of the present invention at its lower end with said valve rotating device being keyed to the valve stem 11a by means of valve keys 13, best shown in Fig. 3, so that the valve spring 12 coacts with the valve stem 11a to bias the valve head 11c toward the valve seat 10a. Then, the valve 11 will be opened or closed by respectively pressing upwardly against the bottom of valve stem 11a or releasing it so that spring 12 will close the valve. The valve rotating device of the present invention is interposed between the valve spring 12 and the valve stem 11a so as to transmit the load of said spring to said stem, as is clearly apparent in Figs. 1 and 3.

This valve rotating device is adapted for installation on a standard valve assembly without changing the design or operation thereof by being used merely as a substitute for the conventional spring retainer generally found on a poppet valve assembly. This valve rotating device is arranged for positively rotating valve 11, always in the same rotative direction, when said device is subjected to an increased load from valve spring 12 when the valve either is being opened or is fully opened. The rotational movement is so timed that the valve will rotate only when it is off its valve seat 10a.

The valve rotating device of the present invention is made up of a plurality of parts. These comprise in Figs. 1 to 3 inclusive an auxiliary spring cover 14, an auxiliary spring 15, a retainer cap 16, a shiftable member or toothed washer 17, and a torsional spring 18 for positioning the washer 17 with respect to the retainer cap 16. These parts coact with the valve spring 12 and with the valve stem 11a through the tapered keys 13. The valve rotating device is effective for causing relative rotation about the valve axis of two parts thereof—namely, the auxiliary spring cover 14 and the retainer cap 16— when the valve rotating device is subjected to an increased longitudinally applied load in the direction of the valve stem axis with this load being applied by the valve spring 12 while the valve is being moved from the closed position to the open position.

Figs. 1, 2 and 3 disclose the relative positions of the various parts of the valve rotating device when the valve head 11c is fully seated. Retainer cap 16 is locked to the lower end of the valve stem 11a by means of conventional tapered keys 13 housed within a funnel shape sleeve 16e of retainer cap 16 so that this retainer cap or part 16 is non-rotatably fixed to the valve 11 so that they both turn together. A bead 13a on the inner diameter portions of the keys 13 fits snugly into a peripheral groove 11b on the valve stem 11a to hold the valve rotating device on the correct position on the valve stem. The tapered keys 13 have sufficient wedging action by the bias of valve spring 12 to lock the retainer cap to the valve stem 11a to prevent relative rotation therebetween.

The auxiliary spring cover 14 is properly located about the retainer cap 16 by an auxiliary compression spring 15 abutting on its lower end in Fig. 3 against an annular shoulder 16b formed as a seat on the retainer cap 16 and at its upper end against the lower side of an inwardly turned flange 14b on the auxiliary spring cover 14. The auxiliary spring cover 14 is held in concentric position with respect to the valve stem longitudinal axis by virtue of the telescopic fit of the inner diameter of the auxiliary spring cover 14, the outside diameter of the auxiliary spring 15, and the diameter of shoulder 16b, since these dimensions are held to proper tolerances during manufacture. An outwardly extending generally annular flange 14a on the auxiliary spring cover 14 has a top surface in Figs. 1 and 3 bearing against the bottom of the valve spring 12 so that the valve spring 12 can act through the valve rotating device to normally bias the valve 11 to the closed position shown in Fig. 1. However, the valve spring 12 normally holds the valve 11 in its closed position in Fig. 1 when the valve lifter is riding on the base circle of the cam on the engine driven cam shaft. The valve spring 12 bears against the upper side of the outwardly projecting flange 14a with sufficient force to maintain the auxiliary spring 15 in the correct amount of compression at all times, as will be explained in more detail hereinafter. Also, the valve spring 12 bears against the upper side of the flange 14a with sufficient force and at a sufficient radius on the longitudinally extending axis of rotation of the valve stem 11a to hold this auxiliary spring cover or part 14 against rotative movement relative to the engine part 10 because the valve spring 12 has its opposite ends non-rotatably engaging the engine part 10 and the auxiliary spring cover or part 14.

It should be apparent now and will become more evident as the description proceeds that in the present disclosure the two adjacent generally annular parts— auxiliary spring cover 14 and retainer cap 16—are relatively rotatable about a common vertical axis coaxial with the valve stem longitudinal axis and that they are mounted and constructed so as to be capable of relative linear movement in both or opposite directions generally along this axis of rotation when the auxiliary spring 15 is compressed to a shorter overall length or permitted to expand to the length shown in Fig. 3. However, this relative movement may be either along this axis or along a path oriented generally similar to the axis of rotation of one of the parts.

Shiftable means is provided for rotatably driving auxiliary spring cover or part 14 relative to retainer cap or part 16. This action takes place whenever the resilient member or compression spring 15 is deflected longitudinally so as to assume a shorter, compressed length under the increased longitudinal load or force exerted by valve spring 12 when the valve 11 is opened or raised in Figs. 1 and 3. This shortening of spring 15 permits relative approach movement along the axis of valve stem rotation of the two adjacent generally annular parts—auxiliary spring cover 14 and retainer cap 16—so as to effect relative rotation between them. This shiftable means includes shiftable member 17, generally annular in form, located between and drivingly connecting for relative rotation the auxiliary spring cover and retainer cap parts 14 and 16. This shiftable member toothed washer 17 is also located generally coaxial with the longitudinal axis of the valve stem 11a but located outwardly from and out of contact with the auxiliary spring 15. A set of coacting engageable teeth is provided between the toothed washer 14 and each of the relatively rotatable parts portrayed as auxiliary spring cover 14 and the retainer cap 16 in Figs. 1, 4, 5, 6 and 7. These teeth, one coacting engageable set shown at 16a and 17a while the other set at 14c and 17c may take the form of clutching devices, serrations, ratchet teeth, wedges, gear-like teeth or any other equivalent structure capable of performing the function. The upper side of the retainer cap 16 has teeth 16a, each tapered upwardly, circumferentially spaced, and radially extending along only a narrow radial width at the outer edge of the retainer cap. Corresponding teeth 17a at the underside of the toothed washer 17 are capable of coacting with and match in contour the previously described teeth 16a. Teeth 17c in the toothed washer 17 and 14c on the auxiliary spring cover 14 are perfectly matched and are adapted to coact together to perform a clutching or ratchet function. However, it should be noted that the teeth 16a, 17a of one set have a greater pitch (horizontal distance between corresponding points on adjacent teeth) and greater vertical depth (between the root and crest of each tooth) than on the other set of teeth 14c, 17c.

This shiftable means also includes a resilient means taking the form of a torsional spring 18 in Fig. 2 for rotatably urging the toothed washer 17 in one direction. This direction is opposite to the relative rotative movement between the auxiliary spring cover and retainer cap parts 14 and 16 so as during the valve closing movement to preset the valve rotating device for the next relative rotative action to be performed when the valve is opened again. This torsional spring 18 is circular in form, as shown in Fig. 2, so as to fit in the circular cavity 16c formed between the shoulder 16b and teeth 16a on the retainer cap 16. One end 18a of this spring 18 is removably mounted in an aperture 16d of the retainer cap 16 with said aperture extending in the axial direction, as seen in Fig. 3. Spring 18 has its other end 18b extending radially outwardly so as to be removably fastened to the toothed washer in a hole 17b therein, and torsional spring 18 is so biased that it tends to hold the teeth 16a and 17a in displaced angular relationship with respect to each other when the valve is in closed position, as in Fig. 1. In other words, the torsional spring 18 biases the toothed washer 17 clockwise in Fig. 2 relative to the retainer cap 16. However, spring 18 is only a positioning spring and has negligible force effect on the operation of springs 12 and 15.

It should be noted that this torsional spring 18 will never force the coarse teeth 16a and 17a to travel out of contact with each other, as readily seen in Figs. 1 and 4, because of the balance existing in the forces exerted by springs 12 and 15. The most extreme separation between the auxiliary spring cover 14 and the retainer cap 16 is shown in Figs. 1 and 4 and it is clearly apparent that opposite, correspondingly engaged teeth 16a and 17a cannot rotate out of engagement. The balance of spring forces serves as a means limiting axial separation of said cover 14 and cap 16 to limit relative rotation between cap 16 and washer 17 to less than a pitch length. However, torsional spring 18 always keeps the washer 17 in engagement with both cover flange 14a and cap 16. The relationship of the opposing forces exerted between the valve spring 12 and the auxiliary spring 15 always plays a part in the operation of the valve rotating device. Therefore, values have been assigned to the spring forces by way of example, but it should be clearly understood that these forces or values are not restrictive on this invention in any sense. Therefore, let us assume the following values:

(1) A force exerted by valve spring 12 in Fig. 1 in the valve-closed position is sixty pounds.

(2) The force exerted by valve spring 12 in the valve-open position is 120 pounds.

(3) The force exerted by auxiliary spring 15 in the Fig. 1 valve-closed position is 60 pounds.

(4) The force exerted by auxiliary spring 15 in the valve open position is 80 pounds.

Therefore, the axial or longitudinal force exerted by the valve spring 12 is just balanced by the longitudinal force exerted by auxiliary spring 15 when the parts are in the valve-closed position of Fig. 1 and a vertical spacing S is maintained as shown in Fig. 4 between the full engagement positions of teeth 16a and 17a, as shown respectively on retainer 16 and toothed washer 17. A comparison of the 120 pound and 80 pound spring force values will readily reveal that the auxiliary spring 15 will be overcome by the valve spring 12 during opening of the valve 11, and as will be brought in more detail hereinafter, the shiftable means will effect valve rotation.

Figs. 4 to 7 inclusive are enlarged schematic circumferential views in elevation of the geometry of progressive motion of the valve rotating device parts during valve rotation. While the actual movement is in rotation, these figures show this motion in developed representation on a flat plane so that they represent a circumferential view of a portion of the valve rotating device in Fig. 1. One complete cycle of operation starting with the valve closed position is shown in sequence by these four figures with the sequential operational steps proceeding from the top to the bottom of this group of figures.

Figs. 1, 2, 3 and 4 show the relative positioning of the valve rotating device parts in the valve-closed position. In Fig. 4, the retainer cap 16 and the toothed washer 17 are spaced apart a vertical distance from each other with the teeth 16a and 17a being a corresponding vertical distance out of full registration or fully seated position. As mentioned before, the compressed length of auxiliary spring 15, while acted upon by the force of valve spring 12 in the valve-closed position, has been so designed that the teeth 16a, 17a cannot rotate past each other as the torsional spring 18 urges the retainer cap 16 and toothed washer 17 to rotate relatively to each in the opposite direction indicated by the arrows 18aa and 18bb respectively in Fig. 4.

As the valve fully opens due to the action of the cam shaft, the loading of the valve spring 12 increases toward a value of 120 pounds and compresses the auxiliary spring 15 so that the parts move from the Fig. 4 to the Fig. 5 position. Even though the auxiliary spring 15 has been compressed by the amount S, it exerts a force of only 80 pounds so that the resultant force reduces the space S to a zero value $S_0$ in Fig. 5. Then, the retainer cap 16 moves, simultaneously with this reduction in space from S to $S_0$, toward the left as shown by arrow 16aa in Fig. 5 so that the teeth 16a and 17a slide to their fully engaged position. Since the cap 16 is non-rotatably fastened to the valve stem 11a, the valve 11 will rotate a slight amount toward the left about its longitudinal axis, as shown by arrow 11aa in Fig. 1. As the valve opens and the valve spring force increases toward 120 pounds, the auxiliary spring 15 can only transmit 80 pounds as a maximum through the retainer cap 16 and all of the additional force up to 40 pounds must be transmitted through the teeth 16a and 17a to produce a rotational effect on the valve 11 since the angle of the teeth 16a and 17a is sufficiently steep so that sliding will take place between them and relative rotation will result. Then, the retainer cap 16 will be rotated or displaced toward the left a distance D in Fig. 5 relative to the auxiliary spring cover 14. As the retainer cap 16 moves toward the left in Fig. 5 in the direction of the arrows 16aa, sliding takes place also at either one or both ends of the auxiliary spring 15, either on the shoulder 16b or the lower side of the inturned flange 14b. Toothed washer 17 is locked against the stationary auxiliary spring cover 14 by full engagement of the teeth 14c, 17c so as to prevent rotation therebetween during the relative sliding action of teeth 16a, 17a moving the retainer cap 16 to the left in Fig. 5 and rotating the valve in the direction of arrow 11aa in Fig. 1. The auxiliary spring cover 14 is locked against rotation by its frictional contact with the valve spring 12 which in turn is locked against rotation on the engine part 10 at 10b.

When the valve 11 reaches the fully open position, the auxiliary spring cover 14, retainer cap 16 and toothed washer 17 will assume the relative position shown in Fig. 5. The valve spring 12 is exerting the force of 120 pounds against the auxiliary spring cover flange 14a with 80 pounds of this force being transmitted to the retainer cap 16 through the auxiliary spring 15 bearing on shoulder 16b. The remaining 40 pounds of this 120 pound force is transmitted to the retainer cap 16 through the teeth 14c, 17c, 17a and 16a.

As the valve 11 in Fig. 1 moves longitudinally and downwardly to close again, space S is restored, as shown in either Fig. 6 or 7. The torsional spring 18 now becomes active and rotates the toothed washer 17 clockwise in Fig. 2 so that the tapered faces on teeth 16a and 17a slide relative to each other until the teeth 14c and 17c become fully engaged, as shown in Fig. 7. The function of torsional spring 18 is to turn the toothed washer 17 toward the left in Figs. 6 and 7 with the teeth 17c overriding teeth 14c with the teeth 17a moving up the slopes of the teeth 16a until full engagement occurs between teeth 14c and 17c without further overriding being possible. Then, when the auxiliary spring cover 14 and retainer cap 16 are being moved axially toward each other in the next operation cycle, teeth 14c and 17c will be firmly locked together. It should be noted that the torsional spring 18 is sufficiently strong, when rotating the toothed washer 17 in the direction 18bb in Fig. 4, to cause overriding the teeth 17c on the teeth 14c until the Fig. 7 position is reached with this latter position being determined by the spacing between the auxiliary spring cover 14 and the retainer cap 16 in the valve closed position, as determined by the equilibrium condition of the forces exerted by springs 12 and 15. The toothed washer 17 now has moved to the left in Fig. 7 by an amount equal to the distance D. The action in Figs. 6 and 7 takes place practically simultaneously but these two figures break down the motion into the separate steps of causing separation S and then the displacement D for illustrative purposes even though the Fig. 6 position probably never occurs in practice because of the bias of the torsional spring 18.

During the next valve operation cycle, the same sequence of movement will repeat progressively from Figs. 4 to 7 and the retainer cap 16 will be rotated clockwise in Fig. 2 or moved in Fig. 5 another displaced distance D to the left by a positive driving action, and this same positive valve rotating action will take place during each succeeding valve operating cycle. The valve rotating action might be summarized by saying that washer 17, torsional spring 18, and the coacting teeth act as a ratchet type drive means in causing relative rotation during the valve-opening stroke and resetting during the valve-closing stroke.

The angular extent of valve rotation, or movement toward the left in Fig. 5, during each valve operating cycle can be controlled by the design of the teeth and of the spacing S.

Several things should be noted about the valve rotating device of the present invention. First, the auxiliary spring 15 absorbs part of the longitudinal or axial load of valve spring 12 while the valve is open so that only a small remaining load is imposed on the teeth and remaining shiftable means to effect valve rotation. Therefore, heavy loads are avoided on the rotation producing mechanism so as to prolong its useful life. Second, the auxiliary spring 15 does not contact the shiftable member or toothed washer 17 to raise the friction difficulty or problem of relative movement therebetween so that the solution of the problem requires the use of a particular type of contact therebetween, for example, a rolling contact with a self-locking angle between a ball and the surface on which it rolls. Hence, in the present construction, sliding contact of washer 17 relative to its adjacent parts can be used to produce valve rotation. In fact, the sliding requires that no self-locking angle be used. No critical self-locking angles or frictions are used. The additional spring, torsional spring 18, permits the teeth 14c and 17c to override each other as the auxiliary spring cover 14 and retainer cap 16 are moved apart progressively from the Fig. 5 to the Fig. 7 positions. Also, the teeth 16a and 17a have a sliding action on their flanks producing the rotation of the valve by the parts moving from the Fig. 4 to the Fig. 5 positions. Third, the toothed washer 17 in effect is cammed on both sides, its upper and its lower side. The cam-like teeth 16a and 17a limit the clockwise rotation of toothed washer 17 under the bias of torsional spring 18 when the toothed washer 17 is preset for the next relative rotation action by moving to the left the displacement distance D from the Fig. 5 to the Fig. 7 positions. Also, the cam-like teeth 14c and 17c act like a slip clutch so as to furnish a positive rotation in one direction and an overriding or slipping action in the other. Fourth, the relative depth and pitch of the two sets of teeth on toothed washer 17 assures that at all times there will be a positive rotational drive in only one direction between the parts. Fifth, the shiftable member or toothed washer 17 is positively fixed against rotation with respect to the stationary auxiliary spring cover 14 when the valve rotation action takes place because teeth 14c and 17c are securely engaged. Sixth, the valve rotating action is so timed that the valve will rotate only when it is off of its seat. Seventh, torsional spring 18 always biases washer 17 into engagement with both cover 14 and cap 16.

Although the valve rotating device is disclosed as having an auxiliary spring 15, it should be apparent that the spring is used only because of the valve spring 12 so that the opposing forces of these two springs cause the relative approach and separation movement along the longitudinal valve axis of the auxiliary spring cover 14 and retainer cap 16 which maintain the limit of separation between these two parts. However, other rotating devices may not necessarily need the springs 12 and 15 but will still work on the same principle of relative approach and separation movement of cover 14 and cap 16. But in a valve rotating device coacting with a valve spring 12, the auxiliary spring 15 or its equivalent is preferred so as to provide a compact, self-contained valve rotating device having all of the advantages mentioned heretofore.

Various changes in details and arrangement of parts can be made by one skilled in the art without departing from the spirit of this invention or the scope of the appended claims.

What is claimed is:

1. A device for effecting relative rotation between two parts comprising two relatively rotatable parts capable of relative movement in both directions along a path oriented generally similar to the axis of rotation of one of said parts, and shiftable means for rotatively driving one of the parts relative to the other part whenever movement in one direction occurs, said shiftable means including a member rotatively fixed with respect to one of said parts and sliding relative to the other during relative rotation, said member has ratcheting teeth coacting with one of said parts.

2. A device for effecting relative rotation between two parts, comprising two relatively rotatable parts capable of relative movement in both directions along a path oriented generally similar to the axis of rotation of one of said parts, and shiftable means for rotatively driving one of the parts relative to the other part whenever movement in one direction occurs, said shiftable means including ratchet drive means drivingly connecting and normally in engagement with both said parts for causing relative rotation.

3. A device for effecting relative rotation between two parts when subjected to an increased longitudinal load, comprising two relatively rotatable parts operatively connected together for longitudinal movement one relative to the other, a resilient member effective upon said relatively rotatable parts and being deflectable under said load, and shiftable means for rotatively driving one of the adjacent parts relative to the other part whenever the resilient member is deflected longitudinally in one direction; said shiftable means including a ratchet drive means located between and drivingly connecting said parts for relative rotation by having at least a portion but not the whole of said load transmitted therethrough, and a resilient means rotatably urging said ratchet drive means in one direction for presetting it for the next relative rotation action.

4. A device for effecting relative rotation between two parts, comprising two relatively rotatable parts capable of relative movement in both directions along a path oriented generally similar to the axis of rotation of one of said parts, and shiftable means for rotatively driving one of the parts relative to the other part whenever movement in one direction occurs, said shiftable means including shiftable member drivingly connecting said parts for relative rotation with a set of coacting engageable ratcheting teeth on said shiftable member and one of said relatively rotatable parts.

5. A device for effecting relative rotation between two parts, comprising two relatively rotatable parts capable of relative movement in both directions along a path oriented generally similar to the axis of rotation of one of said parts, and shiftable means for rotatively driving one of the parts relative to the other part whenever movement in one direction occurs; said shiftable means including a shiftable member drivingly connecting said parts for relative rotation, a first set of coacting engageable teeth on said shiftable member and one of said relatively rotatable parts, and a second set of coacting engageable teeth on said shiftable member and the other of said relatively rotatable parts, at least some teeth of the one set having a greater pitch than the other set.

6. A device for effecting relative rotation between two parts when subjected to an increased longitudinal load, comprising two relatively rotatable parts operatively connected together for longitudinal movement one relative to the other, a resilient member effective upon and operatively connecting said relatively rotatable parts and being deflectable under said load, and shiftable means for rotatively driving one of the parts relative to the other part whenever the resilient member is deflected longitudinally in one direction; said shiftable means including a shiftable member drivingly connecting said parts for relative rotation, a first set of coacting engageable teeth on said shiftable member and one of said relatively rotatable parts, and a second set of coacting engageable teeth on said shiftable member and the other of said relatively rotatable parts, at least some teeth of one set having a greater pitch than the other set.

7. A device for effecting relative rotation between two parts when subjected to an increased longitudinal load, comprising two relatively rotatable parts operatively connected together for longitudinal movement one relative to the other, a resilient member effective upon and operatively connecting said relatively rotatable parts and being deflectable under said load, and shiftable means for rotatively driving one of the parts relative to the other part whenever the resilient member is deflected longitudinally in one direction; said shiftable means including a shiftable member drivingly connecting said parts for relative rotation, a first set of coacting engageable teeth on said shiftable member and one of said relatively rotatable parts, and a second set of coacting engageable teeth on said shiftable member and the other of said relatively rotatable parts, at least some teeth of one set having a greater depth than the other set.

8. A device for effecting relative rotation between two parts, comprising two relatively rotatable parts capable of relative movement in both directions along a path oriented generally similar to the axis of rotation of one of said parts, and shiftable means for rotatively driving one of the parts relative to the other part whenever movement in one direction occurs; said shiftable means including a shiftable member drivingly connecting said parts for relative rotation, a first set of coacting engageable teeth on said shiftable member and one of said relatively rotatable parts, a second set of coacting engageable teeth on said shiftable member and the other of said relatively rotatable parts, at least some teeth of one set having a greater pitch and greater depth than the other set, and resilient means urging said shiftable member in a direction opposite to said relative rotative movement for presetting it for the next relative rotation action.

9. A device for effecting relative rotation between two parts, comprising two adjacent relatively rotatable generally annular parts rotatable generally about a common axis and capable of relative movement in both directions generally along the axis of rotation, and shiftable means for rotatively driving one of the adjacent parts relative to the other part whenever movement in one direction occurs, said shiftable means including a generally annular shiftable member located between and drivingly connecting said parts for relative rotation.

10. A device for effecting relative rotation between two parts, comprising two adjacent relatively rotatable generally annular parts rotatable generally about a common axis and capable of relative movement in both directions generally along the axis of rotation, and shiftable means for rotatively driving one of the adjacent parts relative to the other part whenever movement in one direction occurs; said shiftable means including ratchet drive means located between and drivingly connecting said parts for relative rotation and generally coaxially rotatable therewith, and resilient means rotatably urging said ratchet drive means in a direction opposite to said relative rotative movement for presetting it for the next relative rotation action.

11. A device for effecting relative rotation between two parts, comprising two adjacent relatively rotatable generally annular parts rotatable generally about a common axis and capable of relative movement in both directions generally along the axis of rotation, and shiftable means for rotatively driving one of the adjacent parts relative to the other part whenever generally longitudinal movement in one direction occurs; said shiftable means including a generally annular shiftable member located between and drivingly connecting said parts for relative rotation and generally coaxial therewith, and a first set of coacting engageable ratcheting teeth on said shiftable member and one of said relatively rotatable parts.

12. A device for effecting relative rotation between two parts, comprising two adjacent relatively rotatable generally annular parts rotatable generally about a common axis and capable of relative movement in both directions generally along the axis of rotation, and shiftable means for rotatively driving one of the adjacent parts relative to the other part whenever generally longitudinal movement in one direction occurs; said shiftable means including a generally annular shiftable member located between and drivingly connecting said parts for relative rotation, a first set of coacting engageable teeth on said shiftable member and one of said relatively rotatable parts, and a second set of coacting engageable teeth on said shiftable member and the other of said relatively rotatable parts.

13. A device for effecting relative rotation between two parts when subjected to an increased longitudinal load, comprising two adjacent relatively rotatable generally annular parts rotatable generally about a common axis and capable of relative movement in both directions generally along the axis of rotation, a resilient member effective upon said relatively rotatable parts and being deflectable under said load, and shiftable means for rotatively driving one of the adjacent parts relative to the other part whenever the resilient member is deflected longitudinally in one direction; said shiftable means including a generally annular shiftable member located between and drivingly connecting said parts for relative rotation and generally coaxially rotatable therewith, a first set of coacting engageable teeth on said shiftable member and one of said relatively rotatable parts, a second set of coacting engageable teeth on said shiftable member and the other of said relatively rotatable parts, at least some teeth of one set having a greater pitch and greater depth than the other set, resilient means rotatably urging said generally annular shiftable member in a direction opposite to said relative rotative movement for presetting it for the next relative rotation action, and means limiting axial separation of said parts to prevent complete disengagement of aligned teeth in said one set.

References Cited in the file of this patent

UNITED STATES PATENTS

| 1,347,488 | Arnold | July 27, 1920 |
| 1,644,913 | Burgess et al. | Oct. 11, 1927 |
| 2,516,795 | Norton | July 25, 1950 |